Feb. 23, 1965  D. L. CARRIERE ET AL  3,170,548
OVERSPEED CONTROL MEANS FOR A GAS TURBINE ENGINE
Original Filed Oct. 30, 1961  2 Sheets-Sheet 1

DONALD L. CARRIERE
JAMES T. LASKEY
IVAN M. SWATMAN
INVENTOR.

BY John H. Faulkner
Keith L. Zerschling

ATTORNEYS

Feb. 23, 1965 D. L. CARRIERE ETAL 3,170,548
OVERSPEED CONTROL MEANS FOR A GAS TURBINE ENGINE
Original Filed Oct. 30, 1961 2 Sheets-Sheet 2

DONALD L. CARRIERE
JAMES T. LASKEY
IVAN M. SWATMAN
INVENTORS

BY *John A. Faulkner*
*Keith L. Zerschling*
ATTORNEYS

United States Patent Office 3,170,548
Patented Feb. 23, 1965

---

3,170,548
OVERSPEED CONTROL MEANS FOR A GAS TURBINE ENGINE
Donald L. Carriere, Highland Park, James T. Laskey, Livonia, and Ivan M. Swatman, Birmingham, Mich., assignors to Ford Motor Company, Dearborn, Mich., a corporation of Delaware
Original application Oct. 30, 1961, Ser. No. 148,603. Divided and this application Dec. 28, 1962, Ser. No. 248,010
3 Claims. (Cl. 192—3)

This invention relates to a gas turbine engine and more particularly to a turbine overspeed speed control means.

This application is a division of our copending application S.N. 148,603, filed October 30, 1961.

In gas turbine engines, the power turbine that is employed to drive a load usually operates at very high speeds. It is not unusual for a power turbine to operate in the region of 30,000 to 40,000 r.p.m. If for some reason, for example, the sudden removal of a load from the turbine, the speed of the turbine rises very rapidly, the turbine wheel may burst due to the centrifugal force generated at these high speeds. Certain prior art systems attempt to control overspeed by means of a governor mechanism that acts to reduce the fuel supply to the engine. The time constant of these systems, however, is often so large that the wheel bursts before the motive fluid supply to the engine can be substantially reduced.

The present invention provides a means for preventing the turbine wheel from reaching a speed that will cause the turbine wheel to burst due to centrifugal force. This is accomplished by providing a brake mechanism that is designed to engage when the turbine reaches a selected speed level over normal operating speeds. In the preferred embodiment of the invention, a stationary brake drum surrounds the turbine shaft and a pair of brake shoes are carried by the shaft. A bolt passing through the shaft holds the brake shoes in a position spaced from the brake drum during normal operating speeds of the turbine. This bolt has a section of reduced diameter that is designed to rupture due to the centrifugal force exerted upon it by the brake shoes when the speed of the turbine reaches the selected speed over normal operating speeds. The brake shoes then move into engagement with the brake drum and the speed of the turbine is stabilized and reduced.

The invention also provides a means for reducing or cutting off the fuel supply to the burner that provides motive fluid to the turbine. The movement of the brake shoes into engagement with the brake drum permits a control circuit that controls the fuel supply to the burner to reduce or cut off the supply of fuel. In the preferred embodiment of the invention, this is accomplished by providing a thermally responsive circuit breaker in the control circuit and by placing this circuit breaker in heat transferring relationship with respect to the brake drum. When the brake shoes engage the brake drum, the temperature of the brake drum will rise very rapidly thereby opening the circuit breaker, de-energizing the control circuit and cutting off the supply of fuel to the burner that provides motive fluid for the turbine.

An object of the invention is the provision of a turbine overspeed control means for a gas turbine engine.

Another object of the invention is the provision of a turbine overspeed control means for a gas turbine engine that acts very rapidly to reduce the speed of a turbine that has reached overspeed conditions.

A further object of the invention is the provision of a turbine overspeed control means for a gas turbine engine including a mechanical means that acts very rapidly to reduce the speed of a turbine that has reached overspeed condition and including an electrical means responsive to the actuation of the mechanical means for reducing the fuel supply to the turbine.

Other objects and attendant advantages of the invention will become more readily apparent as the specification is considered in connection with the attached drawings in which.

Figure 1:
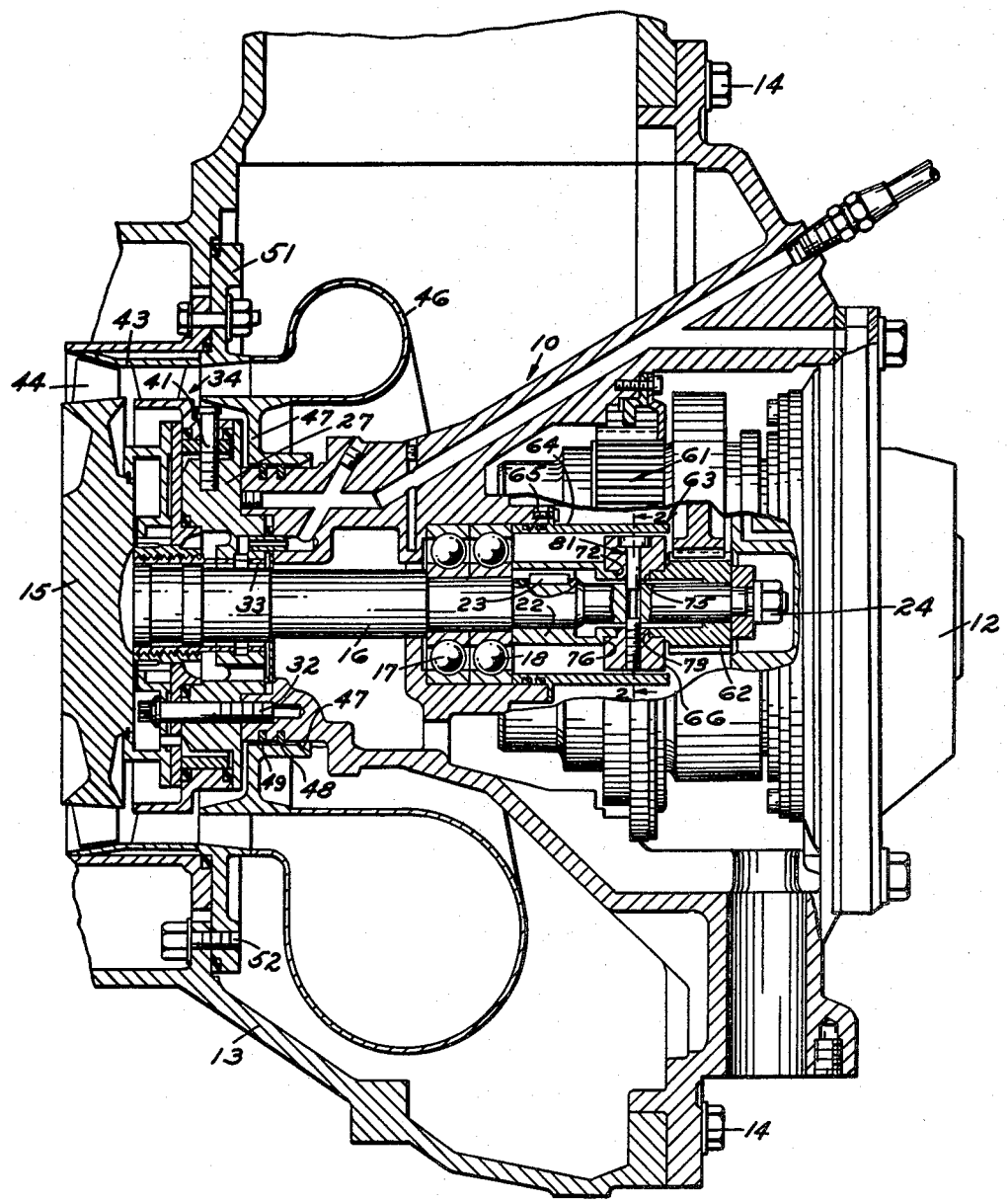
FIG. 1 is a sectional view, partially in elevation, through a portion of a gas turbine engine and a portion of the overspeed control mechanism of the invention.

Referring now to the drawings in which like reference numerals designate like parts throughout the several views thereof, the numeral 10 designates a housing for a portion of the gas turbine engine of the present invention which carries the output shaft 12 of the engine. This housing is received in a casing 13 of the engine and is secured thereto by suitable means such as a plurality of bolts 14.

A turbine including wheel 15 and shaft 16 is rotatably mounted in housing 10 by means of a pair of antifriction bearings 17 and 18. A sleeve 22 surrounds the shaft 16 and is keyed thereto by means of a key 23. This sleeve is forced against the inner race of bearing 18 by means of a nut 24 threaded on the shaft 16. This in turn forces the inner race of bearing 17 against a shoulder on shaft 16. The wheel 15 and the shaft 16 are thus rotatably supported in the housing 10 and are positioned axially therein by the above described structure.

A turbine nozzle support member 27 is positioned over the end of housing 10 and is affixed thereto by a plurality of screws 32. A sleeve type bearing 33 positioned between the turbine nozzle support member 27 and the shaft 16 aids the bearings 17 and 18 in rotatably supporting the turbine wheel 15 and the shaft 16 within the housing.

A turbine nozzle, generally designated by the numeral 34, is supported from the nozzle support member 27 by a plurality of radial pins, one of which is shown at 41. A shroud 43 is supported from the tips of the blades of nozzle 34 and it extends radially and axially outwardly over the tips of turbine wheel blades 44.

A turbine scroll assembly is provided for supplying motive fluid—hot combustion gases from a combustion chamber—to the turbine nozzle and the turbine. This scroll assembly comprises a scroll 46 having an inwardly extending flange 47 supported from the housing 10 by a pair of piston rings 48 and 49 and having an outer flange 51 positioned by the casing member 13 through a plurality of bolts, one of which is shown at 52.

The above described structure is more fully disclosed in copending application S.N. 820,323, filed June 15, 1959, in the name of Ivan M. Swatman and assigned to the assignee of this invention.

Figure 2:
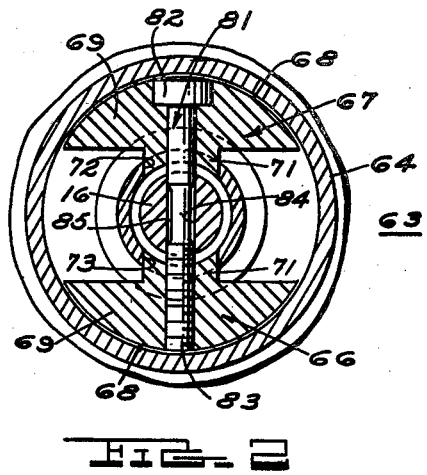
FIG. 2 is a sectional view, partially in elevation, taken along the lines 2—2 of FIG. 1.

FIGS. 1 and 2 show a mechanical means for stabilizing and reducing the speed of the turbine wheel 15 and shaft 16 when the turbine wheel exceeds a selected speed level over normal operating speeds. Such an overspeed condition may occur if the load is suddenly removed from the turbine wheel. In this invention a load is connected to the output shaft 12 which in turn is coupled to turbine wheel 15 and shaft 16 through an output gearing mechanism generally designated by the numeral 61. This gearing mechanism may include a spur gear 62 formed on the end of sleeve 22. The sudden removal of the load may occur through a failure in the gearing 61 or in other coupling mechanisms that couple the output shaft 12 to an external load. If the wheel rotates at speeds greatly in excess of normal operating speeds it may be ruptured due to the high centrifugal forces developed and the particles thereof may be thrown through the casing of the engine. This not only destroys the engine but it also presents a hazard to personnel that are located in the vicinity of the engine.

The mechanical means mentioned above comprises a centrifugal brake mechanism, generally designated by the numeral 63. Ths brake mechanism has a stationary member, preferably a brake drum 64 affixed to the housing 10 by suitable fastening means, for example, machine screws, one of which is shown at 65. A pair of brake shoes 66 and 67 are provided to cooperate with the brake drum. Each of these brake shoes has a face 68 defining one edge of a main body section 69 and a reduced inwardly extending rectangular or square portion 71.

The turbine shaft 16 carries guide means for receiving the brake shoes 66 and 67. This guide means may take the form of apertures 72 and 73 positioned in the sleeve 22 that are complementary to the shape of reduced portions 71 of the brake shoes. These apertures are defined by a first pair of spaced side walls extending in spaced parallel planes that are positioned perpendicularly to the axis of shaft 16 and by a second pair of spaced side walls extending in planes positioned perpendicularly to the first mentioned set of parallel planes. The sleeve may also be provided with grooves 75 and 76 for receiving the main body portion 69 of the brake shoes. Fastening means are provided for affixing the brake shoes to the shaft 16 and for spacing the faces 68 from the brake drum 64 during normal operating conditions of the engine. This means preferably takes the form of a bolt 81 having an enlarged head 82 engaging the brake shoe 67 and a threaded end 83 engaging the brake shoe 66. The central portion of the bolt passes through a bore 84 in the shaft 16, and it includes a necked down portion or portion of reduced diameter 85.

In operation, the brake shoes 66 and 67 rotate with the turbine wheel 15, the shaft 16 and the sleeve 22. As pointed out above, the bolt 81 provides a means for positioning the faces 68 in spaced relationship from the brake 64. This situation prevails during all normal operating speeds of the engine. If for some reason, however, the engine should overspeed and reach a selected speed level above normal operating speeds, the brake shoes 66 and 67 will exert a large force on the bolt 81 due to the centrifugal force generated at these high speeds. This force will be sufficient to either rupture or elongate the necked down portion 85 of the bolt 81 sufficiently to permit the brake shoes 66 and 67 to move outwardly so that the faces 68 engage the brake drum 64. It can be appreciated that this will require relative little movement and that the apertures 72 and 73 and the grooves 75 and 76 in the sleeve 22 provide a guide means for this movement. These apertures and grooves in cooperation with the main body portion 69 and the reduced portion 71 of the brake shoes retain a driving relationship between the brake shoes and the turbine shaft 16.

In actual practice, the turbine wheel 15 may operate in the range of 37,500 r.p.m. at full speed and load. The necked down portion 85 of the bolt 81 may be designed to elongate or rupture when the turbine speed reaches a speed of 42,000 r.p.m. This is considerably below the burst velocity of the turbine wheel which may be in the neighborhood of 70,000 r.p.m. When the faces 68 come into engagement with the brake drum 64 the speed of the turbine will be stabilized at 42,000 r.p.m. for a short period of time and then will be substantially reduced even though full power is still being applied to the turbine by motive fluid flowing through the scroll 46 and the nozzle 34. It can be appreciated that very high temperatures will be developed in the brake drum and the brake shoes as the result of the very rapid relative motion between these two members and because of the energy that needs to be dissipated. It is estimated that the temperatures may rise from a normal of between 100° and 200° F. when the brake mechanism is not engaged to a high of 1000° F. a short time after engagement. It is necessary, therefore, to select a material for these elements that will operate for at least a short period of time at these temperatures. SAE 4340 steel hardened to a Brinell hardness number of 352, which has a short time tensile strength of 103,500 p.s.i. at a temperature of a thousand degrees Fahrenheit, is a suitable material, and either the brake drum or the faces of the brake shoes should be chrome plated to reduce the possibility of galling. The bolt 81 may be constructed of SAE 4140 steel hardened to a Brinell number ranging from 468–497.

Figure 3:
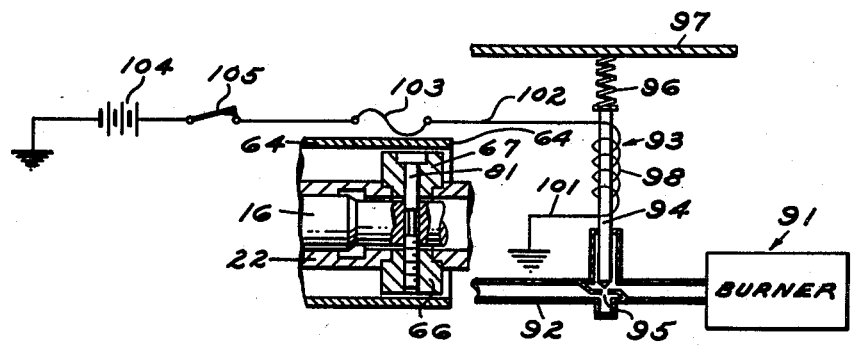
FIG. 3 is a schematic showing a means for controlling the fuel supply to a burner that supplies motive fluid to the turbine in response to overspeed conditions of the turbine.

The rapid rise in temperature of the brake drum discussed above provides a very excellent means for reducing or cutting off the fuel supply to the burner of the engine that supplies the turbine 15 with motive fluid. Referring now to FIG. 3, there is shown a burner or combustion chamber 91 that is supplied with fuel through a fuel line 92. An electrically operated valve, generally designated by the numeral 93, preferably a solenoid operated valve that is normally closed when unenergized, is employed to control the supply of fluid to the burner. This valve includes a rod 94 constructed of magnetic material that is biased to engage valve seat 95 by means of a spring 96. This spring abuts the end of the rod 94 and a support member 97 positioned within the turbine. The electrically operated valve 93 also includes a winding 98 positioned around the rod 94 and having one end grounded through a lead 101. The other end of the winding 93 is connected through a lead 102 to a thermally responsive circuit breaker, for example, a fuse 103. A source of electrical energy, preferably a storage battery 104, energizes the winding 98 through a switch 105 and the fuse 103.

The thermally responsive circuit breaker or fuse 103 is positioned in heat exchange relationship with respect to the brake drum 64, for example, the fuse 103 may be mounted in direct contact with the brake drum 64. This thermally responsive circuit breaker should be designed to open when the temperature of the clutch drum has risen several hundred degrees over normal operating temperature as a result of the engagement of the brake shoes with the brake drum.

Thus, during normal operating conditions of the engine the control circuit described above is energized as shown in FIG. 3 with the winding 98 of the electrically operated valve energized from battery 104 through switch 105 and fuse 103. This raises the rod 94 from the valve seat 95 and permits a full flow of fluid to the burner 91. The throttle controls for controlling the exact amount of the fuel to be fed to the burner 91 through the conduit 92 in response to ambient conditions and the load on the engine has not been illustrated. As shown, the electrically operated valve 93 reduces or preferably completely shuts off the fuel to the burner in response to overspeed conditions.

When overspeed conditions are reached and the faces 68 of brake shoes 66 and 67 come into contact with brake drum 64, the very rapid rise in temperature that results will open the control circuit for the valve 93 by melting the fuse 103 or by operating any other thermal responsive circuit breaker that may be employed as an equivalent of the fuse. This immediately de-energizes the winding 98 and the rod 94 will come into contact with the valve seat 95 under the impetus of spring 96. This shuts off the fuel to the burner 91 and hence reduces and in time cuts off the motive fluid supplied to the turbine wheel 15 from the burner 91 through the scroll 46 and the turbine nozzle 34.

Thus, the present invention provides a means for immediately reducing the speed of a turbine that has reached overspeed or runaway conditions. This is a mechanical means that will act almost immediately and very rapidly to do this job. In addition, there is provided a means for reducing the supply of motive fluid to the turbine in response to the actuation of this mechanical means.

It will be understood that the invention is not to be limited to the exact construction shown and described, but that various changes and modifications may be made without departing from the spirit and scope of the invention, as defined in the appended claims.

We claim:

1. In a gas turbine engine, a housing, a turbine and a turbine shaft rotatably mounted within said housing, means mounted within said housing for supplying motive fluid to said turbine, a burner connected to said means, fuel supply means connected to said burner for supplying fuel thereto, a centrifugal brake mechanism coupled between said housing and said shaft, said centrifugal brake mechanism including means for bringing said centrifugal brake mechanism into engagement when the speed of the shaft reaches a selected level, a fuel control means connected to said fuel supply, said fuel control means including means positioned in heat transferring relationship to said centrifugal brake mechanism and responsive to the heat generated by the engagement of said centrifugal brake mechanism for reducing the fuel supply to said burner.

2. In a gas turbine engine, a housing, a power turbine rotatably supported within said housing, a burner connected to supply motive fluid to said turbine, an electrically operated control means for controlling the supply of fuel to said burner, a source of electrical energy, a thermally operated circuit breaker adapted to open when its temperature exceeds a selected level, said electrically operated control means being energized to supply fuel to said burner from said source of electrical energy through said thermally operated circuit breaker, a centrifugal overspeed brake mechanism having movable means coupled to said shaft and stationary means supported by said housing, said movable means engaging said stationary means under overspeed conditions of said turbine and said shaft, said engagement resulting in a rapid rise in temperature of said stationary means to a value in excess of said selected level, said circuit breaker being positioned in heat transferring relationship with respect to said stationary means whereby said circuit breaker will open and said control means will be de-energized to cut off the fuel supply to said burner.

3. In a gas turbine engine, a housing, a power turbine including a shaft rotatably supported within said housing, means for supplying motive fluid to said power turbine, said means including a burner, means including a fuel conduit connected to said burner for supplying said burner with fuel, a normally closed solenoid operated valve positioned within said fuel conduit, a battery, a fuse, said battery being connected through said fuse to energize and open said solenoid operated valve, a centrifugally operated brake mechanism, said centrifugally operated brake mechanism including a brake drum affixed to said housing and a pair of brake shoes coupled to said shaft and adapted to move into engagement with said brake drum due to centrifugal force developed when the speed of said turbine reaches a selected level above the normal operating speed range of the turbine, said fuse being positioned in heat transferring relationship with respect to said brake drum, whereby the heat generated by the engagement of said brake shoes with said brake drum melts said fuse thereby de-energizing and closing said solenoid operated valve.

References Cited in the file of this patent

UNITED STATES PATENTS

| | | |
|---|---|---|
| 1,796,508 | Dake | Mar. 17, 1931 |
| 2,879,874 | Malmros | Mar. 31, 1959 |
| 3,006,355 | Thomas | Oct. 31, 1961 |
| 3,048,364 | Troeger et al. | Aug. 5, 1962 |

FOREIGN PATENTS

| | | |
|---|---|---|
| 84,446 | Netherlands | Mar. 15, 1957 |